(12) United States Patent
Uragaki

(10) Patent No.: US 12,034,897 B2
(45) Date of Patent: Jul. 9, 2024

(54) INFORMATION PROCESSING APPARATUS AND CONTROL METHOD THAT PROVIDE AN INSPECTING FEATURE OF INSPECTING FOR A PREDETERMINED CHARACTER STRING IN SCANNED DATA DEPENDING ON A TRANSMISSION DESTINATION

(71) Applicant: CANON KABUSHIKI KAISHA, Tokyo (JP)

(72) Inventor: Takeshi Uragaki, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/825,265

(22) Filed: May 26, 2022

(65) Prior Publication Data

US 2022/0394150 A1    Dec. 8, 2022

(30) Foreign Application Priority Data

Jun. 3, 2021 (JP) .................................. 2021-093723
Mar. 30, 2022 (JP) .................................. 2022-056180

(51) Int. Cl.
*H04N 1/32* (2006.01)
*G06T 7/00* (2017.01)
(Continued)

(52) U.S. Cl.
CPC ....... *H04N 1/32545* (2013.01); *G06T 7/0002* (2013.01); *H04N 1/00816* (2013.01); *G06T 2207/30168* (2013.01)

(58) Field of Classification Search
CPC .......... H04N 1/00816; H04N 1/32545; H04N 1/00331; H04N 1/00843; H04N 1/4115;
(Continued)

(56) References Cited

U.S. PATENT DOCUMENTS

| 2005/0195446 A1* | 9/2005 | Kasatani | ............ H04N 1/00331 |
| | | | 358/402 |
| 2012/0198534 A1* | 8/2012 | Ohta | ..................... G06F 21/445 |
| | | | 726/8 |
| 2023/0156140 A1* | 5/2023 | Uragaki | ............. H04N 1/00864 |
| | | | 358/1.14 |

FOREIGN PATENT DOCUMENTS

| JP | H08194412 A | 7/1996 |
| JP | 2005184743 A | 7/2005 |

(Continued)

*Primary Examiner* — Chad Dickerson
(74) *Attorney, Agent, or Firm* — ROSSI, KIMMS & McDOWELL LLP

(57) ABSTRACT

An information processing apparatus capable of switching execution of an inspection process depending on a transmission destination. The information processing apparatus includes at least one memory device that stores a set of instructions, and at least one processor that executes the set of instructions to: extract a character string from scan data obtained by scanning a document, control to execute an inspection process, which determines whether a predetermined character string registered beforehand is included in the extracted character string, in a case where a first transmission destination is designated as information about a transmission destination of the scan data, and control not to execute the inspection process in a case where a second transmission destination different from the first transmission destinations is designated as the information about the transmission destination of the scan data.

12 Claims, 17 Drawing Sheets

(51) Int. Cl.
*G06V 30/41* (2022.01)
*H04N 1/00* (2006.01)

(58) Field of Classification Search
CPC ........... H04N 1/00838; H04N 1/00856; H04N 1/00883; H04N 1/2376; H04N 1/00925; H04N 1/00777; H04N 1/00875
USPC ............................... 358/1.11–1.18, 400–404
See application file for complete search history.

(56) References Cited

FOREIGN PATENT DOCUMENTS

JP         2007048053 A     2/2007
JP         2008287609 A  * 11/2008

* cited by examiner

| Transmission destination after scanning | Inspection process |
|---|---|
| Corporate Storage Server | Not Inspect |
| Cloud Service | Inspect |
| E-Mail | Inspect |

| Transmission destination after scanning | Inspection process | |
|---|---|---|
| maruko@abcd.mail | Not Inspect | ~1002 |
| XXX@mail | Inspect | ~1003 |
| 03-XXXX-XXXX | Not Inspect | ~1004 |

INFORMATION PROCESSING APPARATUS AND CONTROL METHOD THAT PROVIDE AN INSPECTING FEATURE OF INSPECTING FOR A PREDETERMINED CHARACTER STRING IN SCANNED DATA DEPENDING ON A TRANSMISSION DESTINATION

BACKGROUND OF THE INVENTION

Field of the Invention

The present invention relates to an information processing apparatus capable of executing an inspection process, a control method therefor, a storage medium storing control program therefor, and an information processing system.

Description of the Related Art

An information processing apparatus like an image forming apparatus is provided with various communication functions, such as a scan data transmission function, a facsimile function, a function for transmitting a stored document, and a function for transmitting data to an external storage unit. In a zero trust security model, since it is necessary to suspect all things, it becomes important to always verify that exchanged data does not lead to information leakage and that an unfair operation is not performed.

Japanese Laid-Open Patent Publication (Kokai) No. 2005-184743 (JP 2005-184743A) discloses a method that verifies scan data and prevents an unfair operation from being performed. This publication proposes a technique that applies optical character recognition (OCR) to a scanned document, checks (inspects) whether an extracted text matches a character string and a position that are registered in advance, and limits an output method according to the inspection result. This prevents an unfair operation of the scan data.

However, the apparatus in JP 2005-184743A always executes the inspection to scan data obtained. Accordingly, since the inspection process is executed even to data that is transmitted to a transmission destination that does not need the inspection, the inspection process is time-consuming.

SUMMARY OF THE INVENTION

The present invention provides an information processing apparatus that is capable of switching execution of an inspection process depending on a transmission destination.

Accordingly, an aspect of the present invention provides an information processing apparatus including at least one memory device that stores a set of instructions, and at least one processor that executes the set of instructions to: extract a character string from scan data obtained by scanning a document, control to execute an inspection process, which determines whether a predetermined character string registered beforehand is included in the extracted character string, in a case where a first transmission destination is designated as information about a transmission destination of the scan data, and control not to execute the inspection process in a case where a second transmission destination different from the first transmission destinations is designated as the information about the transmission destination of the scan data.

The present invention achieves at least one of an information leakage prevention effect and shortening of running time of an inspection process about scan data.

Further features of the present invention will become apparent from the following description of exemplary embodiments with reference to the attached drawings.

BRIEF DESCRIPTION OF THE DRAWINGS

FIG. 10A and FIG. 10B are views showing correspondences between transmission destinations of scan data and necessities of the inspection process in the second embodiment.

DESCRIPTION OF THE EMBODIMENTS

Figure 1:
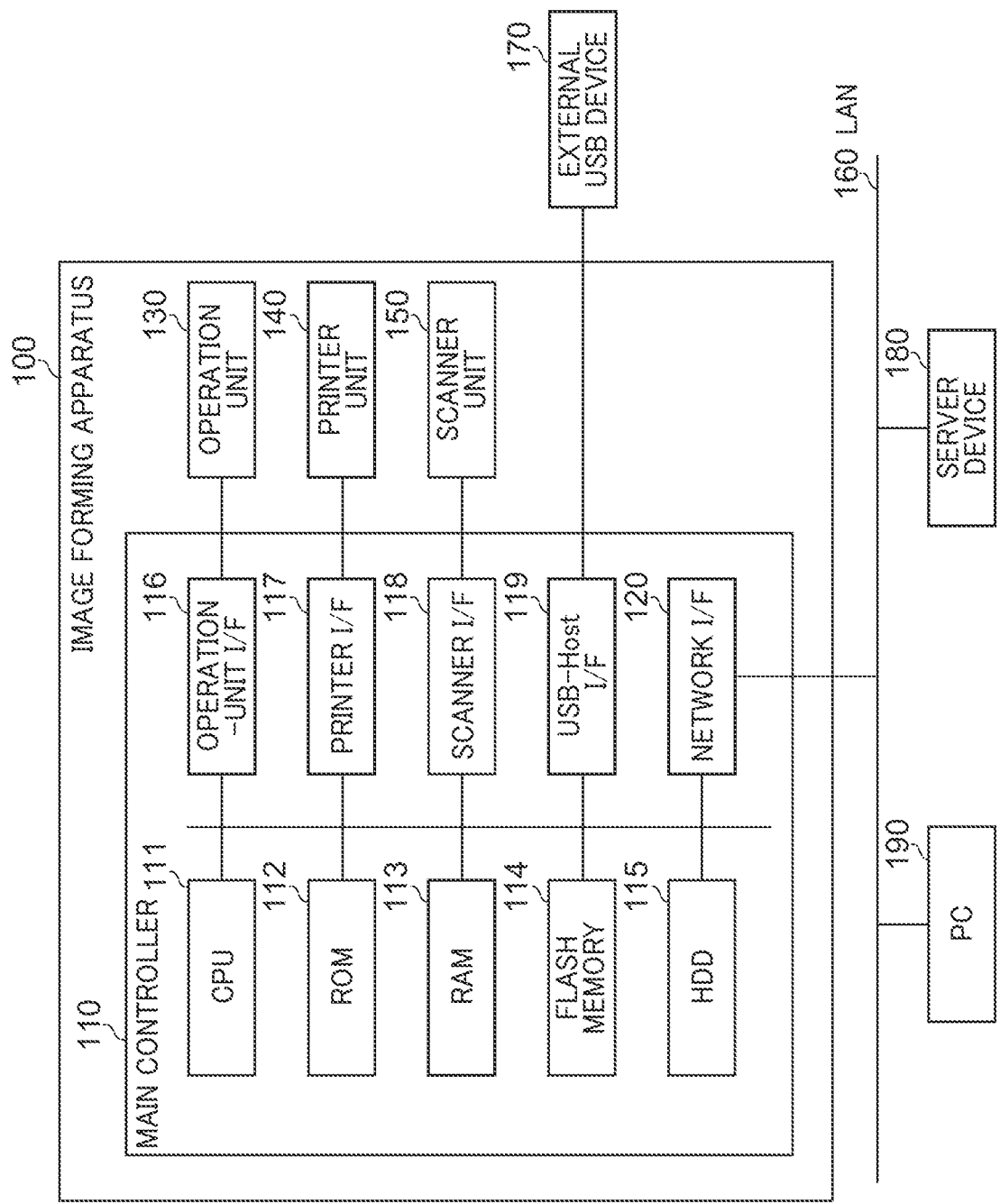
FIG. 1 is a block diagram schematically showing an entire configuration of an information processing system including an image forming apparatus as an information processing apparatus according to a first embodiment of the present invention.

Hereafter, embodiments according to the present invention will be described in detail by referring to the drawings.

FIG. 1 is a block diagram schematically showing an entire configuration of an information processing system including an image forming apparatus 100 as an information processing apparatus according to a first embodiment of the present invention. Although the image forming apparatus 100 is exemplified as the information processing apparatus, it is not limited to an image forming apparatus. The image forming apparatus 100 is an MFP (Multifunction Peripheral), for example. FIG. 1 shows blocks constituting hardware of the image forming apparatus 100.

The information processing system is constituted by connecting the image forming apparatus 100 with a server device 180 and a PC 190 through LAN 160 so as to be communicable. The image forming apparatus 100 has a main controller 110, an operation [part] unit 130, a printer unit 140, and a scanner unit 150.

In the main controller 110, a CPU 111 reads programs for the main controller 110 stored in a ROM 112 or a flash memory 114, develops it to a RAM 113, and runs it. The ROM 112 is a read-only memory that stores a boot program for the main controller 110, BIOS, fixed parameters, etc. The RAM 113 is a random access memory that is used to store a program and temporary data when the CPU 111 controls the main controller 110. The flash memory 114 stores a loader, a kernel, and an application. Moreover, the flash memory 114 stores license information for enabling the functions of the image forming apparatus 100 and a signature and public key for falsification detection of a program in addition to execution programs.

An HDD 115 is a hard disk drive that stores applications, various data, and print data that is received from PC 190 through a network I/F 120. Programs read from the flash memory 114 and run by the CPU 111 include a print application program. Then, the print application program converts print data stored in the HDD 115 into image data that can be printed by the printer unit 140. The image data is also stored in the HDD 115.

Moreover, a scan application program is included in firmware that is read from the flash memory 114 and executed by the CPU 111. According to the scan application program, the scanner unit 150 obtains image data by reading a document and transmits the image data to the HDD 115. Then, the read image data is stored in the HDD 115.

An operation-unit I/F 116 is an interface for transmitting an instruction input by a user of the image forming apparatus 100 through the operation unit 130 to the CPU 111. Moreover, the operation-unit I/F 116 receives a process content for changing a content displayed on the operation unit 130 from the CPU 111 and transmits it to the operation unit 130. The operation unit 130 is provided with a liquid crystal display unit having a touch panel function, a keyboard, etc., displays a state of the image forming apparatus 100 and an operation menu, and receives a user's instruction.

A printer I/F 117 is an interface for connecting the main controller 110 and the printer unit 140. The printer unit 140 prints an image on a recording medium on the basis of the image data transferred from the HDD 115 through the printer I/F 117.

A scanner I/F 118 is an interface for connecting the main controller 110 and the scanner unit 150. The scanner unit 150 reads an image on a document as image data using a line sensor constituted by a CCD (Charge Coupled Device) etc. The scanner unit 150 transfers the read image data to the HDD 115 through the scanner I/F 118. The stored image data can be printed by the printer unit 140. A copy process can be performed when the printer unit 140 prints the image data read by the scanner unit 150.

A USB-Host I/F 119 is an interface for connecting the main controller 110 and an external USB device 170. A FAX unit is an example of the external USB device 170. When the FAX unit is provided as the external USB device 170, the external USB device 170 performs a facsimile transmission process on the basis of the image data transferred from the HDD 115 through the USB-Host I/F 119. Moreover, the external USB device 170 generates image data on the basis of received data and transfers the image data to the HDD 115 through the USB-Host I/F 119. The image data stored in the HDD 115 can be printed on a recording medium by the printer unit 140, as mentioned above. A USB memory, a USB keyboard, etc. may be used as other examples of the external USB device 170. An update file required for updating the firmware can be transferred from the USB memory.

A network I/F 120 connects the main controller 110 to the LAN 160 and communicates with the PC 190 on the LAN 160. The PC 190 is connected with the image forming apparatus 100 through the LAN. The PC 190 can transmit print data to the image forming apparatus 100, can operate the apparatus through a WEB browser, and can transfer a firmware file to the image forming apparatus 100. Furthermore, the image forming apparatus 100 is connected with the server device 180 through the LAN 160 and can set the server device 180 as a transmission destination of scan data and various logs. A transmission protocol in this system is SMTP (Simple Mail Transfer Protocol), FTP (File Transfer Protocol), or the like, but the protocol is not limited.

Moreover, the image forming apparatus 100 can use the server 180 as a storage unit of necessary set values and data. However, the image forming apparatus 100 may not be connected with the server device 180 in some environments. A cloud service may be employed in place of the server device 180.

Next, a data inspection function that is executed by the CPU 111 of the main controller 110 in order to execute an inspection process of scan data will be described.

Figure 2:
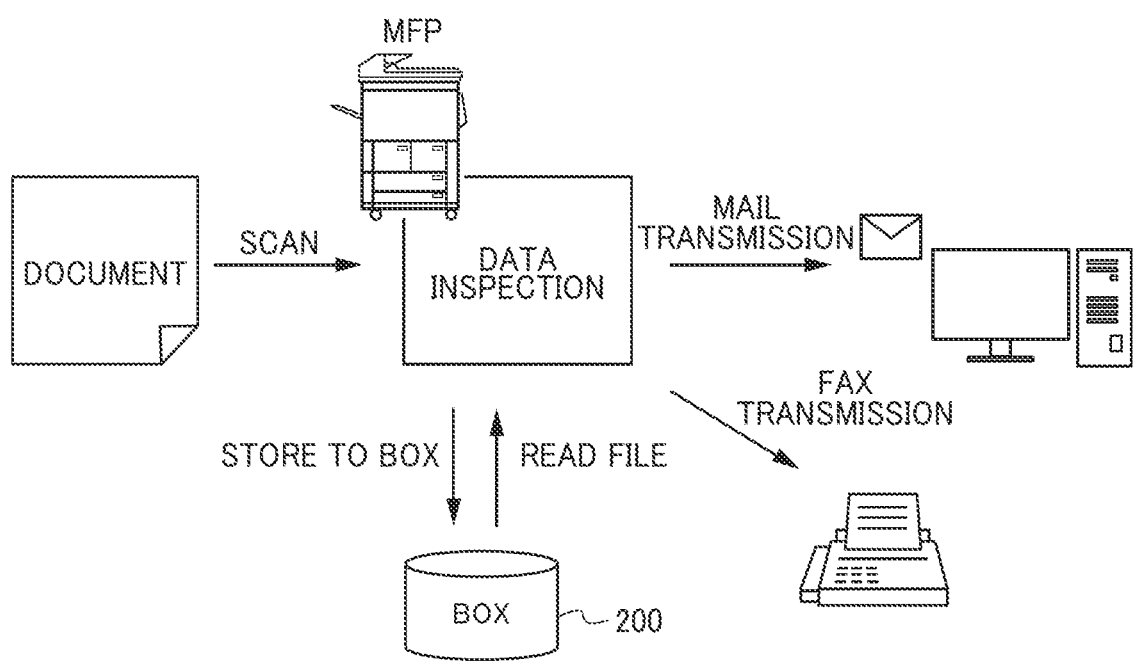
FIG. 2 is a view schematically showing an inspection process executed by the image forming apparatus in FIG. 1.

FIG. 2 is a view schematically showing the inspection process executed by software that achieves the data inspection function. A software program that achieves the data inspection function is stored in the ROM 112, the flash memory 114, or the HDD 115.

When a job, such as a copy job, a scan-and-transmission job, a FAX transmission job, or a BOX-storing job, that needs execution of scan is input, the image forming apparatus 100 performs the inspection process in order to check contents of scan data. In the description, the BOX-storing job scans a document and stores scan data into a BOX 200 (storage unit) of the image forming apparatus 100. The BOX 200 is achieved by the HDD 115, for example. It should be noted that the BOX 200 is not necessarily constructed in the image forming apparatus 100. The BOX 200 may be constructed in a place that can be accessed through communication.

As a result of the inspection process, only when it is determined that an inspection keyword (an inspection-target character string) as a predetermined character string that is registered by an administrator or a user registered beforehand is not included, a subsequent process is performed. For example, the copy job prints the scan data. The scan-and-transmission job transmits the scan data through an e-mail, FTP, or the like. The FAX transmission job performs a FAX transmission process of the scan data. In the BOX-storing job, the scan data is stored in the BOX 200 after giving an ID.

Hereinafter, the scan data (document) stored in the BOX 200 is referred to as "stored scan data" when it is particularly distinguished from the scan data before storing. Moreover, output (transmission and print) of the stored scanned data read from the BOX 200 is called "BOX-output".

In a BOX-output process, the stored scan data is read from the BOX 200 and is printed or transmitted in response to a user's instruction. The scan data may vary after storing into the BOX 200 until it is read and is used for output (transmission and print). For example, the stored scan data may be falsified by an unfair operation. Accordingly, the image forming apparatus 100 transmits or prints the scan data after performing the inspection process anew at the time of the BOX-output. Moreover, an inspection keyword at the time of the BOX-output may also differ from an inspection keyword set at the time of storing the scan data. Also in this point, there is an advantage for performing the inspection process anew at the time of the BOX-output.

Figure 3:
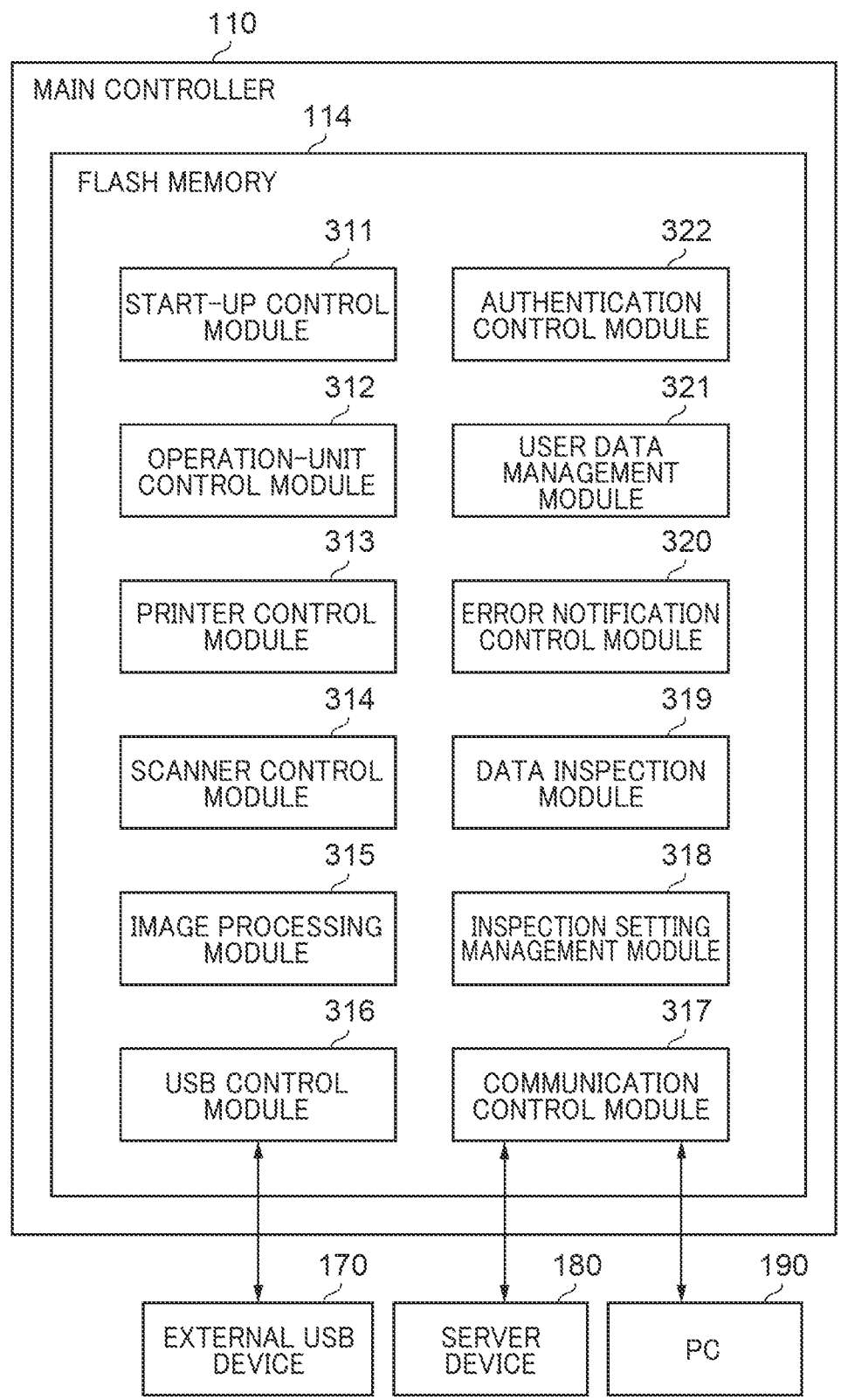
FIG. 3 is a functional block diagram showing functions of a main controller shown in FIG. 1.

FIG. 3 is a functional block diagram showing functions of the main controller 110. A configuration of software modules executed by the CPU 111 of the main controller 110 will be described using FIG. 3. The software modules (programs) shown in FIG. 3 are stored in the flash memory 114 (FIG. 1). Each software module in FIG. 3 is mainly achieved by collaboration of the CPU 111, flash memory 114, and RAM 113.

A start-up control module 311 is a program that controls a process at the start-up of the image forming apparatus 100. The start-up control module 311 starts an OS (operation system) of the main controller 110 and starts a basic system for operations of various programs. An operation-unit control module 312 is a program for controlling the operation unit 130 through the operation-unit I/F 116. A printer control module 313 is a program that controls the printer unit 140 through the printer I/F 117. A scanner control module 314 is a program that controls the scanner unit 150 through the scanner I/F 118.

An image processing module 315 performs an image process of scan data received through the scanner control module 314 and also performs a process that extracts character information from the scan data. Although character information is extracted from the scan data by OCR (Optical Character Recognition), it may be extracted by other methods. It should be noted that the image processing module 315 may extract character information not only for performing the inspection process but also for creating data by adding character information to scan data.

A USB control module 316 is a program for controlling the external USB device 170 through the USB-Host I/F 119. A communication control module 317 communicates with the server device 180 and PC 190 through the network I/F 120. In this communication, the scan data and the setting data required for the inspection are transmitted and transferred through the LAN 160. The transferred setting data are stored into the HDD 115.

An inspection setting management module 318 manages a set value that defines whether the inspection is required at the time of scan (ON/OFF of an inspection mode). Moreover, the inspection setting management module 318 receives a set value required for the inspection from a user and stores it into the HDD 115. At this time, a setting screen that receives the set value required for the inspection may be displayed on the operation unit 130 through the operation-unit control module 312 or may be provided by a Web server function so that a user can operate it by a Web browser installed in the PC 190. The inspection setting management module 318 stores the set value received from the user into the HDD 115, and then provides the set value when a data inspection module 319 executes the inspection.

The data inspection module 319 reads character information that is extracted from scan data by the image processing module 315 when scan is executed by the scanner control module 314. Then, the data inspection module 319 checks (inspects) whether an inspection keyword that is managed by the inspection setting management module 318 is included in the read character information.

When it is determined that the content of the scan data includes the inspection keyword that prohibits transmission by a data inspection process mentioned later in FIG. 4B, an error notification control module 320 gives notice of error information as a notification process. For example, the operation unit 130 and the external device connected to the LAN 160 are notified of the error information.

A user data management module 321 manages data for individual users. The managed data include a destination table used by the FAX transmission etc., scan data stored in the BOX 200, and various setting values. An authentication control module 322 manages authentication information about the users and receives an authentication operation when a user uses the image forming apparatus 100. On the basis of the received authentication information, the authentication control module 322 becomes available to read data associated with a permission from the user data management module 321.

Next, scan of a document and inspection of scan data will be described by referring to FIG. 4A, FIG. 4B, FIG. 5A, and FIG. 5B.

Figure 4A:
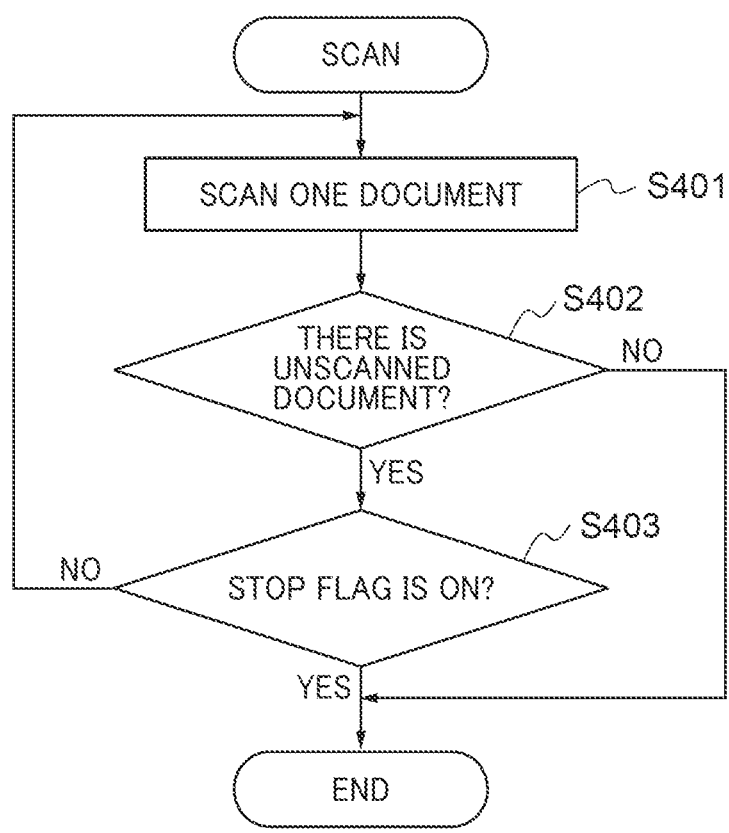
FIG. 4A, FIG. 4B, and FIG. 4C are flowcharts respectively showing a scan process, a data inspection process, and another scan process that are executed by the image forming apparatus.

FIG. 4A is a flowchart showing a scan process. This process is achieved when the CPU 111 develops a program stored in the flash memory 114 to the RAM 113 and runs it. This process starts when a job that requires scan is input. As jobs that require scan, a copy job, scan-and-transmission job, facsimile transmission job, and BOX-storing job are assumed.

Figure 14:
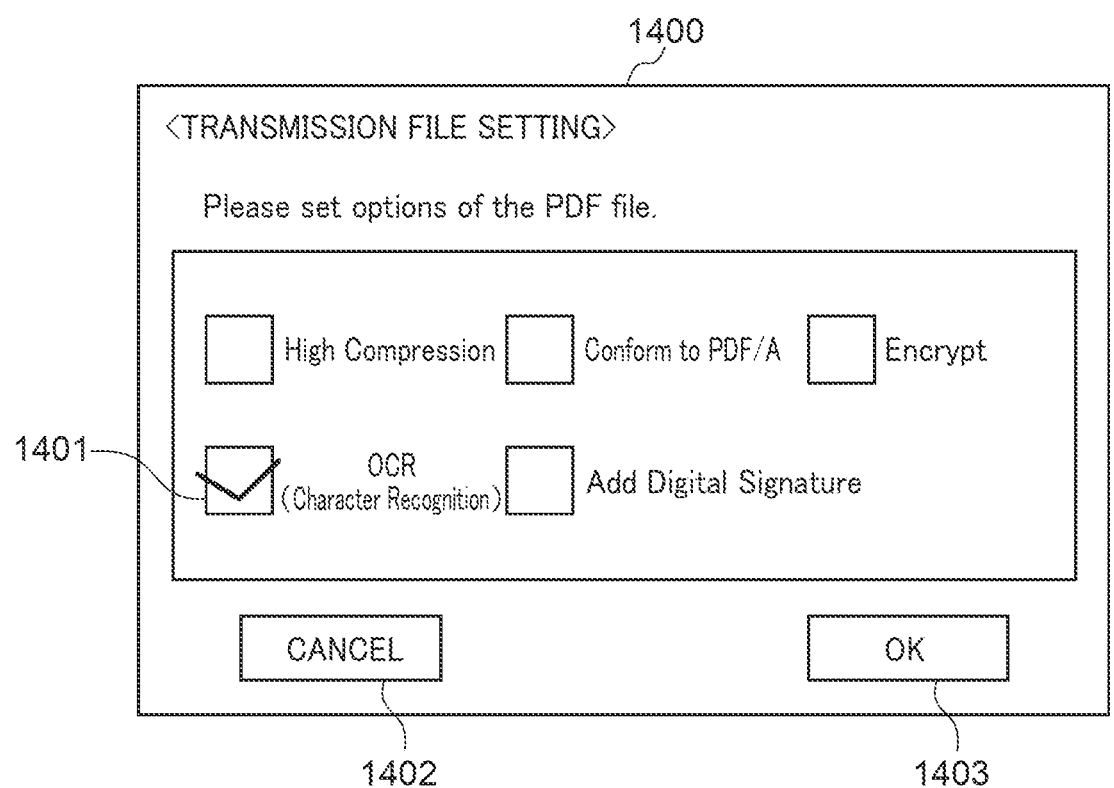
FIG. 14 is a view showing an example of a screen on which a file format is set at a time of transmitting scan data in the fourth embodiment.

In a step S401, the scanner control module 314 scans one document using the scanner unit 150, and the image processing module 315 generates scan data on the basis of a read result. At this time, the image processing module 315 may execute OCR to the scan data and generate scan data having text information. Whether the OCR is executed simultaneously with the scan is determined on the basis of a user's instruction given through a screen 1400 shown in FIG. 14 on which a file format at the time of scan is set, for example. A button 1401 for instructing execution of the OCR is displayed in FIG. 14. The button 1401 will be selected by a user's touch operation. The OCR execution instruction may be set up for every scan data corresponding to one document or may be set up to a job corresponding to a plurality of documents. The CPU 111 may treat the scan data as Searchable PDF, for example, when the button 1401 is operated.

In a step S402, the scanner control module 314 determine whether there is an unscanned document. When there is no unscanned document, the process shown in FIG. 4A is finished. In the meantime, when there is an unscanned document, the scanner control module 314 determines whether a stop flag is set to ON in a step S403. It should be noted that the stop flag is set to ON in a step S421 in FIG. 4B mentioned later. When the stop flag is not set to ON (is set to OFF), the scanner control module 314 returns the process to the step S401 and transfers to scan of a next document. In the meantime, when the stop flag is set to ON, the process shown in FIG. 4A is finished.

Figure 4B:
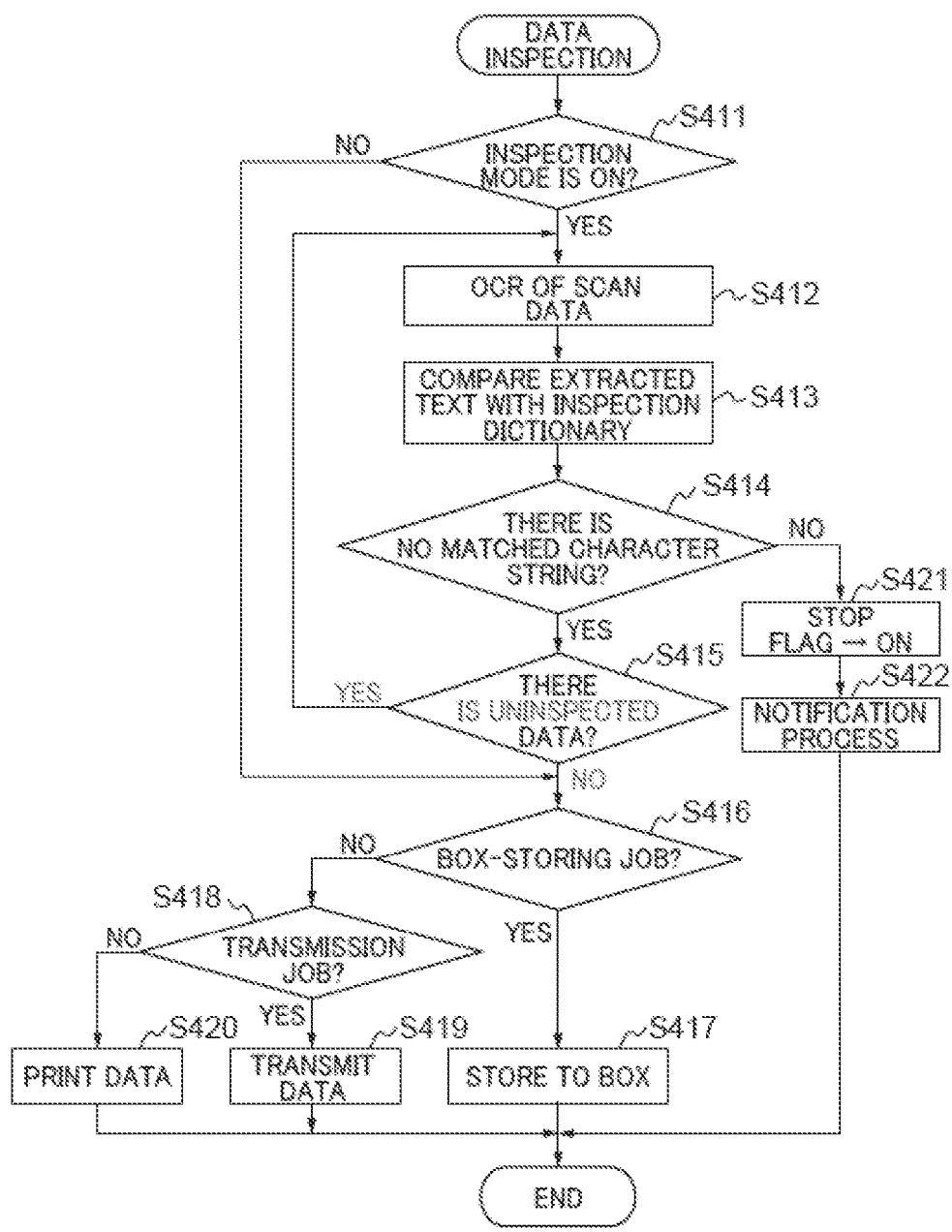
Figure 4C:
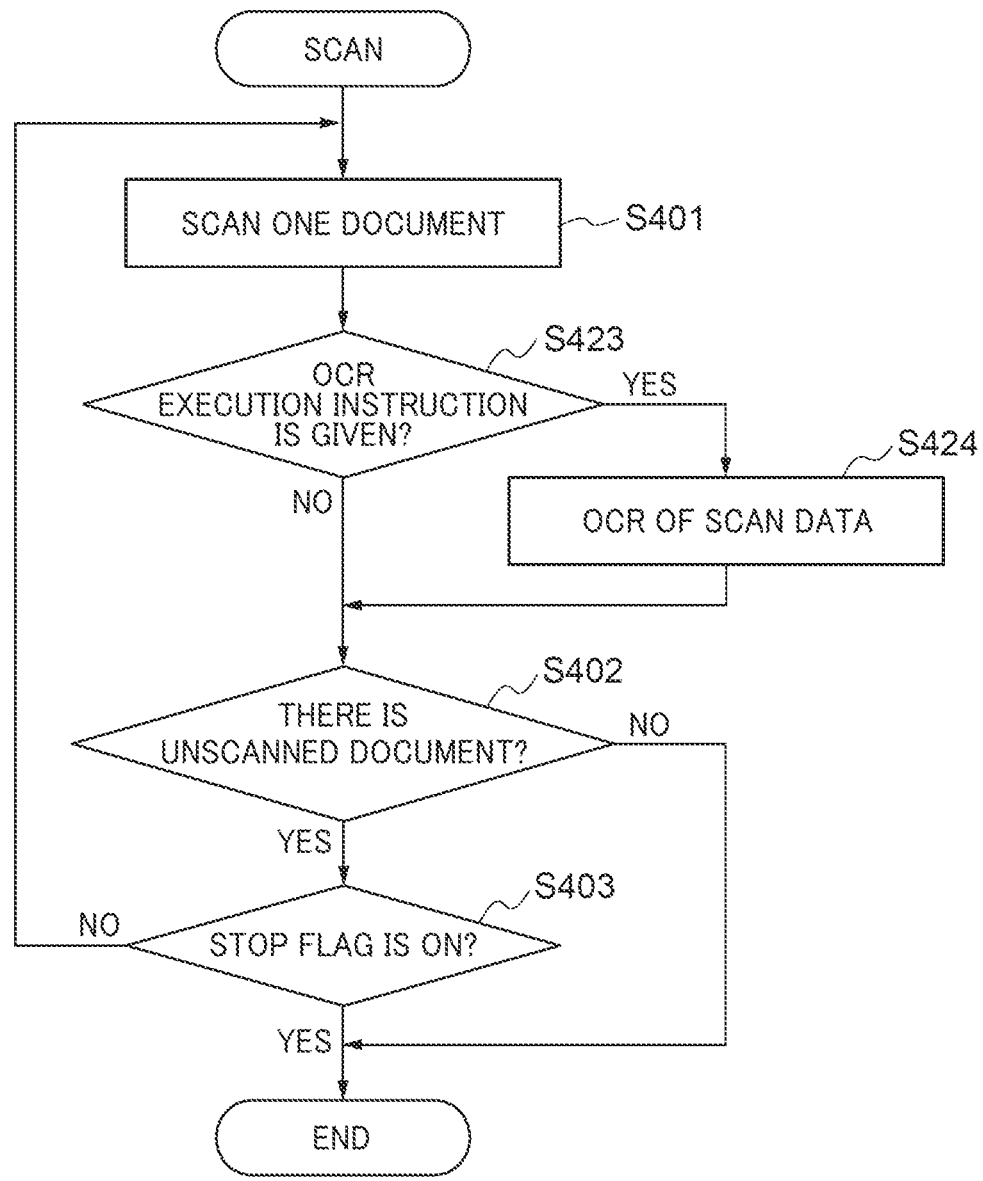

The scan process described in FIG. 4A may be constituted like FIG. 4C, for example. FIG. 4C is a flowchart showing a scan process that is a modified example of the scan process in FIG. 4A. Descriptions about steps identical to that in FIG. 4A will be omitted.

In the step S401, the scanner control module 314 scans one document using the scanner unit 150, and the image processing module 315 generates scan data on the basis of a read result.

In a step S423, it is determined whether the button 1401 for instructing execution of the OCR displayed on the screen 1400 (FIG. 14) on which a file format at the time of scan is set is ON (is selected). When the execution of the OCR is instructed (the button 1401 is ON), the process proceeds to a step S424 and the OCR of scan data is executed. The OCR at this time shall be executed by the image processing module 315 as with OCR executed in a step S412 (FIG. 4B).

The OCR in the step S424 may be executed in accuracy identical to the OCR executed in the step S412, or may be lowered in accuracy of character extraction to increase a speed of the OCR. After execution of the OCR, the process proceeds to the step S402. When the button 1401 for instructing execution of the OCR is OFF (is not selected), the process proceeds to the S402.

FIG. 4B is a flowchart showing a data inspection process. This process is achieved when the CPU 111 develops a program stored in the flash memory 114 to the RAM 113 and runs it. This process is started after the start of the scan process (FIG. 4A) and is executed asynchronously with the scan process. For example, the data inspection process may be started at the timing at which the scan data of the first sheet is generated in the scan process. Alternatively, the data inspection process may be started after scan of all documents is completed.

In a step S411, the inspection setting management module 318 determines whether the inspection mode managed is set to ON. When the inspection mode is set to ON, the inspection setting management module 318 proceeds with the process to a step S412. When the inspection mode is set to OFF, the process proceeds to a step S416 because the inspection process is not executed.

In steps S412 through S414, the CPU 111 as a determination unit applies a determination process to the scan data obtained in the step S401. First, in the step S412, the image processing module 315 as an extraction unit extracts a character string (text data) from the scan data obtained in the step S401 by executing the OCR to the scan data. In the step S413, the data inspection module 319 executes data inspection. That is, the data inspection module 319 compares the extracted character string with an inspection dictionary so as to check whether the extracted character string includes the inspection keyword. At least one inspection keyword is registered in the inspection dictionary by a dictionary registration (mentioned later by referring to FIG. 7). The inspection dictionary is managed by the inspection setting management module 318.

In the step S414, the data inspection module 319 determines whether there is no character string that matches the inspection keyword among the extracted character strings (the inspection keyword is not included in the extracted character strings) as the result of the data inspection in the step S413. As a result of the determination, when there is no character string that matches the inspection keyword among the extracted character strings, the data inspection module 319 proceeds with the process to a step S415.

In the step S415, the data inspection module 319 determines whether there is a character string that has not been compared with the inspection dictionary (i.e., whether there is uninspected data). When there is uninspected data, the data inspection module 319 returns the process to the step S412. When there is no uninspected data, the process proceeds to the step S416 because the data inspection of all the data is finished.

In the step S416, the data inspection module 319 determines whether a job input at this time (that becomes a trigger starting the process in FIG. 4A) is a BOX-storing job. When the job input at this time is the BOX-storing job, the data inspection module 319 proceeds with the process to a step S417. In the step S417, the user data management module 321 as a storage unit gives an ID to the inspected scan data and stores it into the BOX 200. The data stored in the BOX 200 becomes stored scan data hereafter. In the step S417, the scan data may be stored together with the text data extracted in the step S412, and it is not limited.

When the job input at this time is not the BOX-storing job, the data inspection module 319 proceeds with the process to a step S418 and determines whether the job input at this time is a transmission job (a scan-and-transmission job or facsimile transmission job). When the job input at this time is the transmission job, the data inspection module 319 proceeds with the process to a step S419. In the step S419, the communication control module 317 transmits the scan data to the transmission destination designated by the user by a designated transmission method (a mail transmission, an FTP transmission, or a facsimile transmission).

At this time, the scan data may be transmitted together with the text data extracted in the step S412. For example, the scan data may be transmitted in a format of a file with text like Searchable PDF. The text may be transmitted as a title or a body of an e-mail.

When the job input at this time is not the transmission job, the printer control module 313 proceeds with the process to a step S420 and prints the scan data using the printer unit 140 because the job input at this time is a copy job.

As a result of the determination in the step S414, when there is a character string that matches the inspection keyword, the process proceeds with the process to a step S421 because the inspected data at this time has high necessity of the information leakage prevention. Accordingly, the inspected data is not printed, transmitted, and stored. In the step S421, the data inspection module 319 turns ON the stop flag managed by the scanner control module 314. This is because the scan data has high necessity of the information leakage prevention and it is appropriate to stop the scan process under execution.

In a step S422, the error notification control module 320 executes a notification process. In this notification process, as shown in FIG. 5A, the error notification control module 320 displays an error screen 500 on the operation unit 130 using the operation-unit control module 312.

Figure 5A:
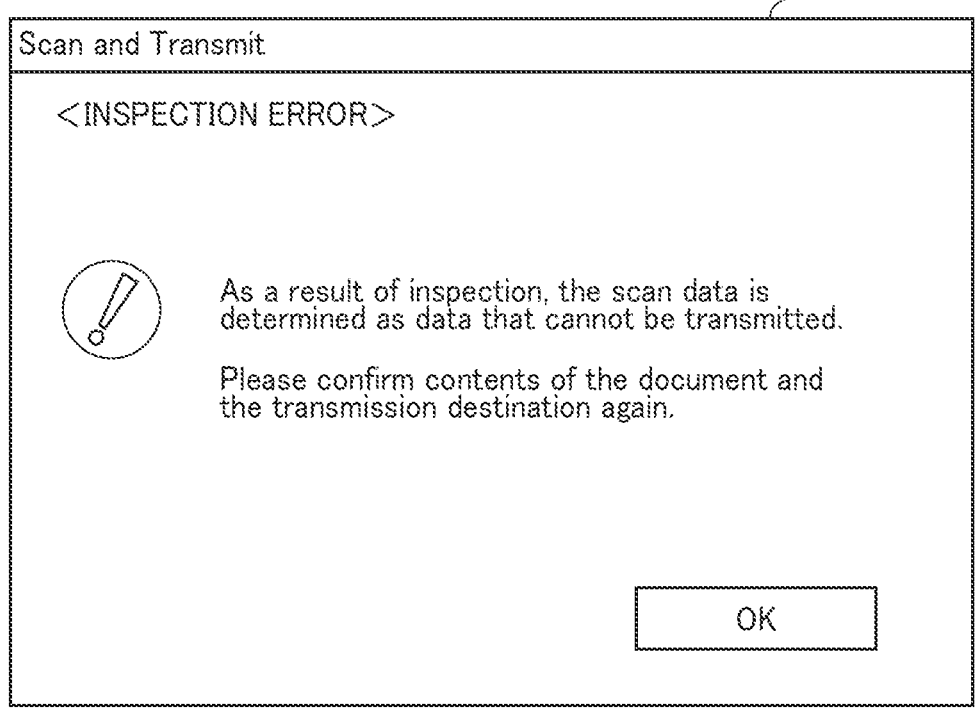
FIG. 5A is a view showing an example of an error screen displayed in S422 in FIG. 4B.

FIG. 5A is a view showing an example of the error screen 500. In the error screen 500, an error message is displayed, and thereby, the user is notified that the inspected data at this time cannot be output because the necessity of the high information leakage prevention is obtained. The notification is not limited to the display of the message, a mark may be displayed and a voice notification may be performed in the notification process.

Figure 5B:
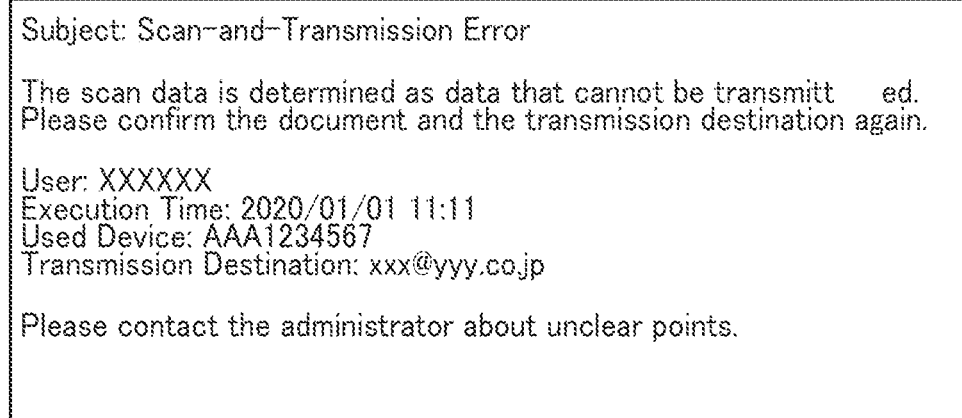
FIG. 5B is a view showing an example of contents of an e-mail transmitted in S422.

Moreover, the user may be notified of contents 510 of an error by an e-mail in the notification process as shown in FIG. 5B. In this case, the error notification control module 320 inquires of the authentication control module 322 the current user, and obtains a user's mail address from the user data management module 321. When the e-mail is transmitted through the communication control module 317, the user is notified that the scanned data cannot be output. The process shown in FIG. 4B is finished after the steps S417, S419, S420, and S422.

Although the inspection process is described so as to consist of the execution of the OCR in the step S412 and the comparison of the character string with the inspection dictionary in the above description, it is not limited to this. In the case where the OCR is executed and scan data is generated in the step S401, the inspection process executed when the inspection mode is set to ON in the step S411 consists of only the comparisons of the character string with the inspection dictionary. Moreover, in the case where the OCR is executed and scan data is generated in the step S401, the OCR of the scan data is executed even when the inspection mode is set to OFF in the step S411. Moreover, an execution order of the flowchart shown in FIG. 4B may be changed as follows, for example. When the data inspection is started, the step S412 is executed first and then the process proceeds to the step S411 and the inspection setting management module 318 determines whether the inspection mode managed is set to ON. When the inspection mode is set to ON, the inspection setting management module 318 proceeds with the process to the step S413. When the inspection mode is set to OFF, the process proceeds to the step S416 because the inspection process is not executed. The subsequent process is the same as the above-mentioned process order.

It should be noted that the notification using the screen and the notification by the transmission of an e-mail may be used together. That is, the error screen 500 is displayed on the operation unit 130 until the user logs off. After the logoff, the user may be notified by the e-mail because it is determined that the user is not near the image forming apparatus 100. Even in this case, the scan data is not transmitted.

It should be noted that there may be jobs as choices other than a copy job, a scan-and-transmission job, a facsimile transmission job, and a BOX-storing job. When another job is input, a corresponding process is executed.

Figure 6:
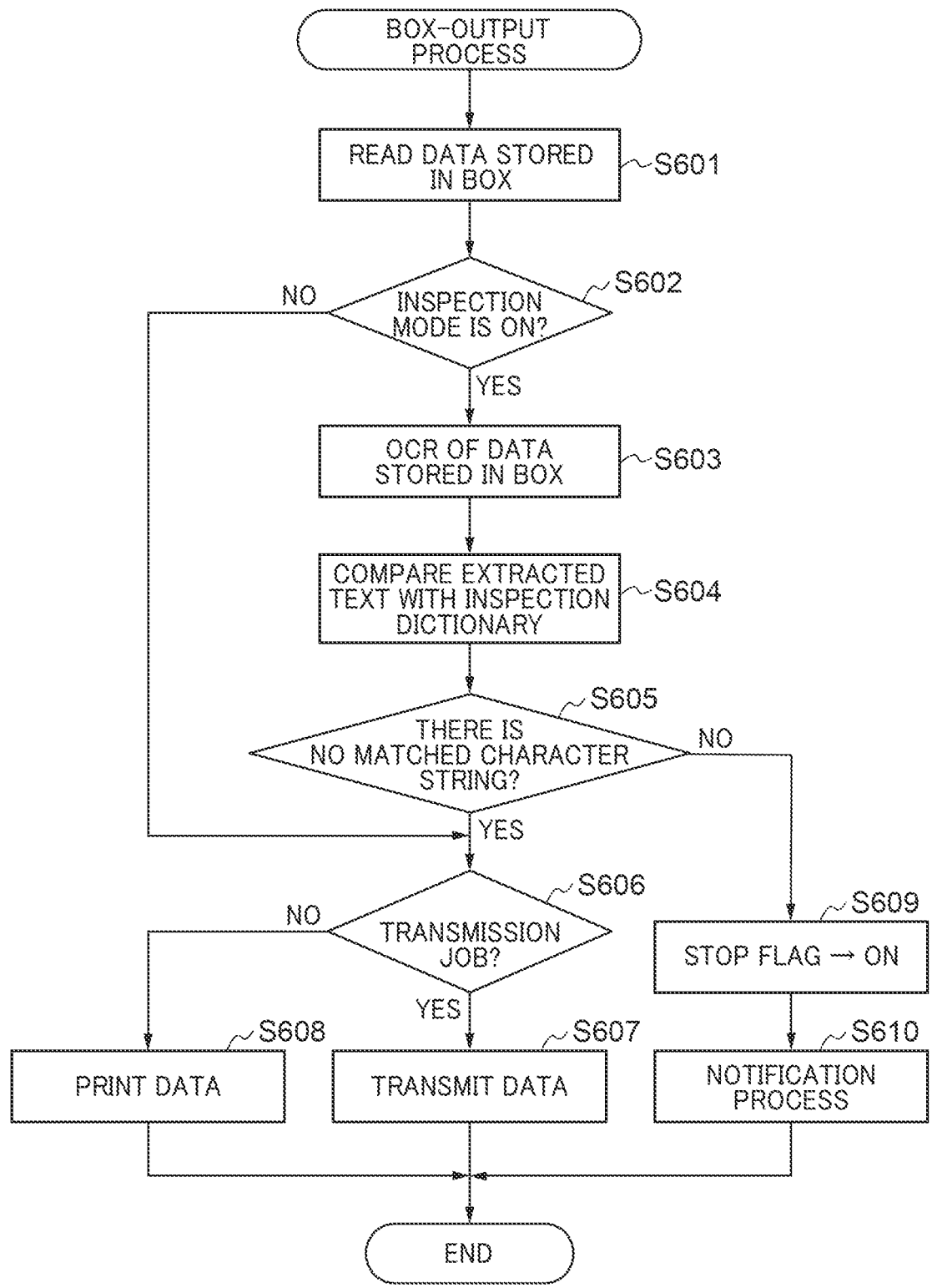
FIG. 6 is a flowchart showing a BOX-output process that is executed by the image forming apparatus.

Next, the BOX-output process that reads the stored scan data from BOX 200 and outputs it will be described. FIG. 6 is a flowchart showing a BOX-output process. This process is achieved when the CPU 111 develops a program stored in the flash memory 114 to the RAM 113 and runs it. This process is started when a job (a BOX-transmission job or a BOX-print job) that needs BOX-output is input. In this process, the data inspection module 319 and the CPU 111 achieve the function as a control unit in the present invention.

In a step S601, the user data management module 321 reads the stored scan data corresponding to the input job from the BOX 200. In a step S602, the inspection setting management module 318 executes the process identical to the process in the step S411. When the inspection mode is set to ON, the inspection setting management module 318 proceeds with the process to a step S603. When the inspection mode is set to OFF, the process proceeds to a step S606.

In steps S603 through S605, the CPU 111 as the determination unit applies the determination process to the stored scan data read from the BOX 200. This is because the scanned data may be falsified in a period between storing and outputting or the inspection keyword may be updated and it is appropriate to perform a data inspection anew at the time of the BOX-output.

First, in the step S603, the image processing module 315 extracts a character string (text) from the stored scan data read in the step S601 by executing the OCR to the scan data concerned. When the text information is given to the stored scan data, the process may proceed to a step S604 without executing the process in the step S603. In the steps S604 and S605, the data inspection module 319 executes the process identical to the steps S413 and S414 in FIG. 4B. As a result of the determination in the step S605, when there is no character string that matches the inspection keyword among the extracted character strings, the data inspection module 319 proceeds with the process to a step S606.

In the step S606, the data inspection module 319 determines whether the job input at this time is the BOX-transmission job. When the job input at this time is the BOX-transmission job, the data inspection module 319 proceeds with the process to a step S607. In the step S607, the communication control module 317 transmits the scan data inspected in the step S604 to the transmission destination designated by the user by a designated transmission method (a mail transmission, an FTP transmission, or a facsimile transmission).

When the job input at this time is not a transmission job, the data inspection module 319 proceeds with the process to a step S608 because the job input at this time is a BOX-print job. In the step S608, the data inspection module 319 prints the scan data inspected in the step S604 using the printer unit 140.

As a result of the determination in the step S605, when there is a character string that matches the inspection keyword among the extracted character strings, the data inspection module 319 proceeds with the process to a step S609 because the inspected data at this time has high necessity of the information leakage prevention. Accordingly, the inspected data is not printed and transmitted. In the steps S609 and S610, the data inspection module 319 executes the process identical to the steps S421 and S422 in FIG. 4. The process shown in FIG. 6 is finished after the steps S607, S608, and S610.

Figure 7:
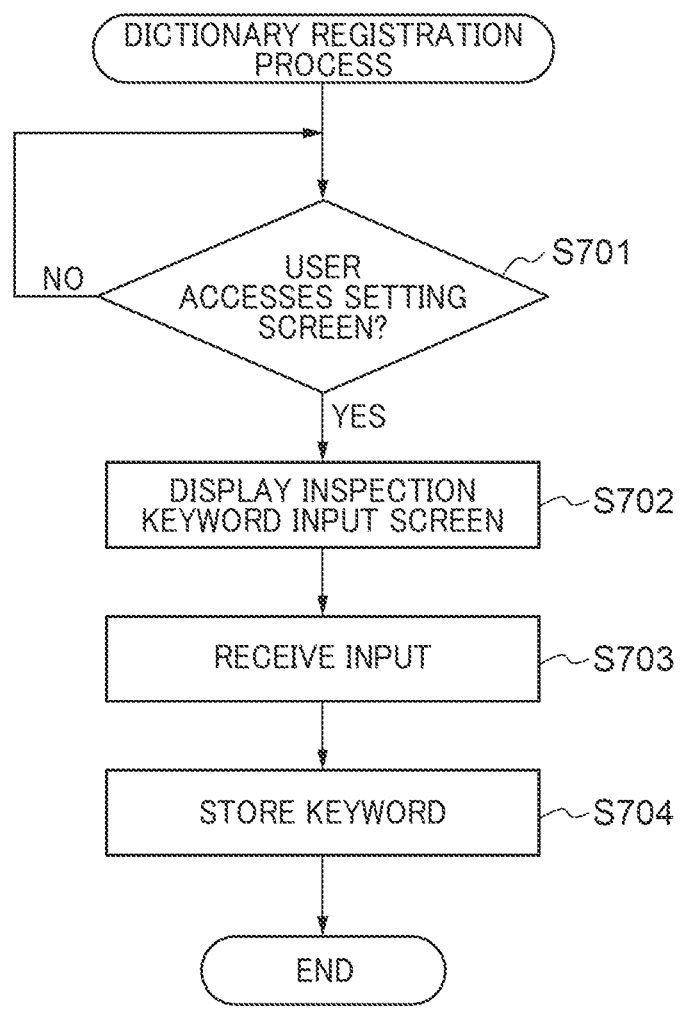
FIG. 7 is a flowchart showing a dictionary registration process that is executed by the image forming apparatus.

FIG. 7 is a flowchart showing a dictionary registration process. This process is achieved when the CPU 111 develops a program stored in the flash memory 114 to the RAM 113 and runs it. This process is started when an execution instruction of the dictionary registration is input from a user through the operation unit 130.

When the execution instruction of the dictionary registration is input, a setting screen is displayed first. The setting screen is displayed on the operation unit 130 or is displayed on a web browser of the PC 190 by a web server function.

Figure 8:
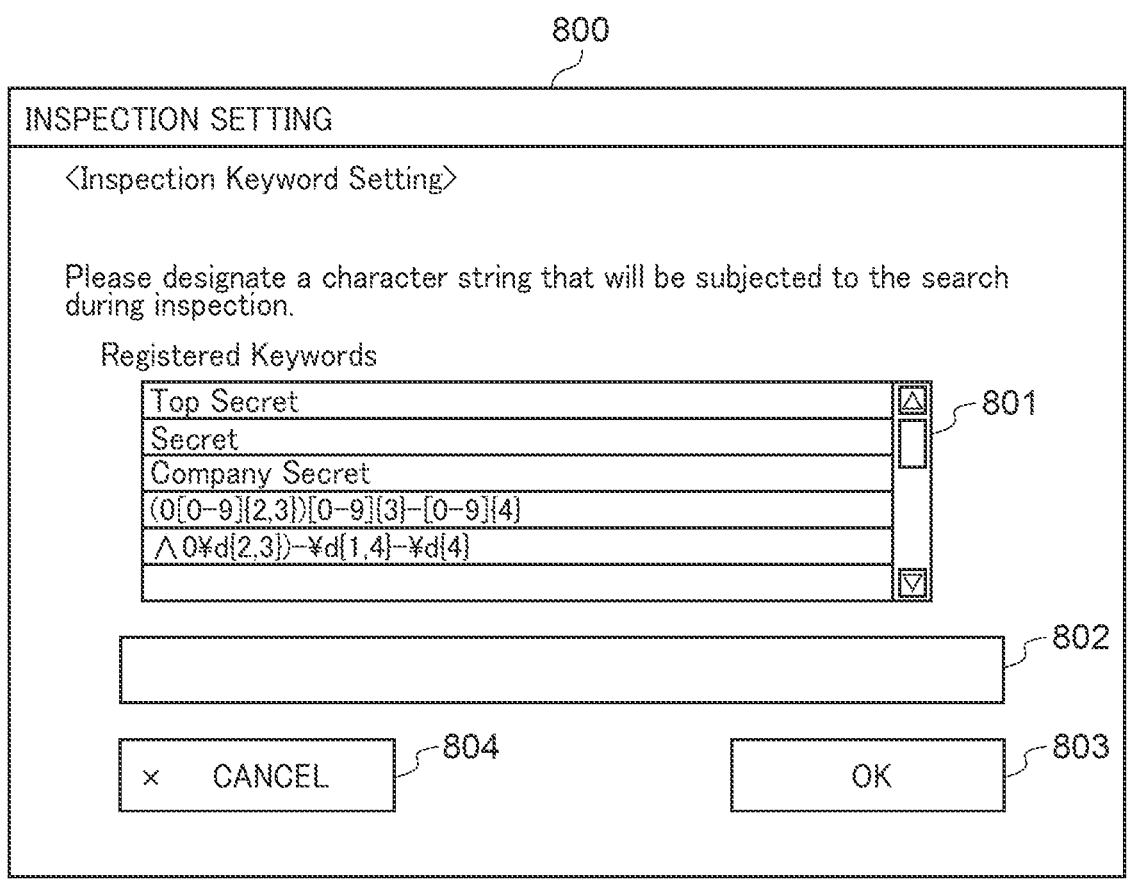
FIG. 8 is a view showing an inspection keyword input screen displayed in S702 in FIG. 7.

In a step S701, the inspection setting management module 318 waits a user's access to the setting screen. When the user accesses the setting screen, the inspection setting management module 318 displays an inspection keyword input screen 800 shown in FIG. 8 on the operation unit 130 in a step S702. On the inspection keyword input screen 800 shown in FIG. 8, a keyword list display area 801, a keyword input reception column 802, an OK button 803, and a cancel button 804 are displayed. In addition, inspection character strings, operations in a failure case of an inspection result of scan data, etc. may be set on a per-user and per-group basis.

In a step S703, the inspection setting management module 318 receives input of an inspection keyword from the user through the inspection keyword input screen 800. The inspection setting management module 318 stores the input inspection keyword into the HDD 115 in a step S704 and finishes the process shown in FIG. 7. The registered contents of the inspection keyword can be updated by executing the process shown in FIG. 7 in a stage where a registered inspection keyword exists. The inspection in the determination process mentioned above is executed using the newest inspection keyword.

According to the embodiment, when storing or outputting of the scan data obtained by scanning a document is tried, the determination process to the obtained scan data is executed first (S412 through S414). The obtained scan data is stored into the HDD (storage unit) 115, is transmitted, or is printed, on condition that the inspection keyword (inspection-target character string) is not included in the character string extracted from the obtained scan data (S414 through S420).

In the meantime, when a job that needs the BOX-output is executed, the determination process to the stored scan data is executed (S603 through S605). That is, a character string is extracted from the stored scan data, and it is determined whether the inspection keyword is included in the extracted character string. Then, when it is determined that the inspection keyword is included in the extracted character string, the stored scan data is not output (S605 to S609). When it is determined that the inspection keyword is not included in the extracted character string, the stored scan data is output (is transmitted (S605 to S606 to S607) or is printed (S605 to S606 to S608)).

Thereby, since the scan data is inspected not only at the time of storing but also at the time of outputting, the image forming apparatus 100 is able to cope with the data falsification after storing and the update of the inspection keyword. Accordingly, the high information leakage prevention effect about scan data can be obtained. Although the inspection keyword may be updated, the inspection at the time of output is executed on the basis of the newest inspection keyword. Accordingly, since the inspection is performed on the condition suitable for the situation at the time of output, the high information leakage prevention effect is obtained.

Moreover, when there is a character string that matches the inspection keyword, the stop flag is turned ON, which stops the scan of an unscanned document if any (S421, S403). Thereby, generation of scan data that has possibility of information leakage can be suspended.

Moreover, since the user is notified of an error (S422) in a case where there is the character string that matches the inspection keyword in the extracted character string, the user is notified that the output of the scan data is impossible in the viewpoint of the information leakage prevention.

Moreover, the necessity of the inspection can be set by ON/OFF of the inspection mode, and the determination process is executed on condition that the inspection mode is set to ON. Thereby, the storing and outputting of data without information leakage can be processed smoothly.

Next, a second embodiment will be described. In the first embodiment, the inspection is executed uniformly whenever a job that needs scan is input. However, when the inspection is indispensable, processing load increases, which increases waiting time until process completion. Accordingly, in the second embodiment of the present invention, the image forming apparatus 100 executes the determination process to scan data only when a job needs the inspection. In the embodiment, a data inspection process differs from the first embodiment, and the other configurations are identical.

Figure 9:
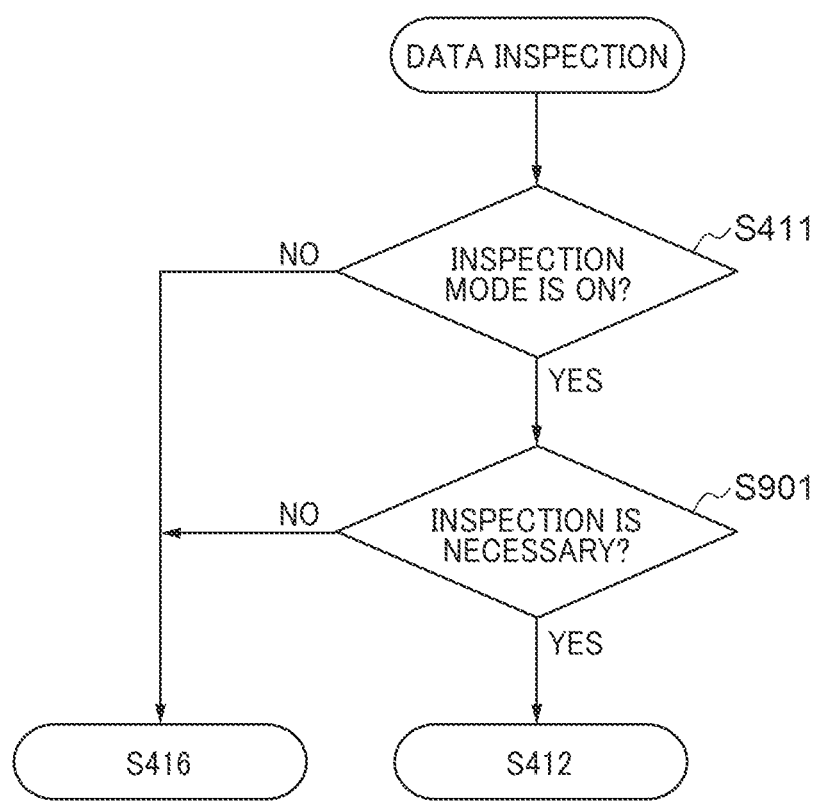
FIG. 9 is a flowchart showing a data inspection process in an image forming apparatus according to a second embodiment of the present invention.

FIG. 9 is a flowchart showing the data inspection process in the image forming apparatus according to the second embodiment. This process is executed by the image forming apparatus 100, and an execution start condition is identical to that of the process shown in FIG. 4B. The data inspection process shown in FIG. 9 differs from the process shown in FIG. 4B in that a step S901 is added, and the other steps are identical to that in FIG. 4B as described above.

As a result of the determination in the step S411, when the inspection mode is set to ON, the inspection setting management module 318 proceeds with the process to a step S901 and determines necessity of the inspection process. When the inspection mode is set to OFF, the process proceeds to the step S416. Even when the inspection mode is set to ON, when the inspection process is set to be unnecessarily, the process proceeds to the step S416. When the inspection mode is set to ON and the inspection process is set to be necessary, the process proceeds to the step S412.

FIG. 10A is a view showing a correspondence between a transmission destination of scan data and necessity of the inspection process. The information showing the correspondences is stored in the flash memory 114, for example, and can be updated by a user at any time. In an example in FIG. 10A, the transmission destinations are divided into a corporate storage server, a cloud server, and a mail server, and to inspect or not to inspect is defined for each destination. However, the correspondences are not limited to this example. For example, as shown in FIG. 10B, to inspect or not to inspect may be registered for a mail address and a telephone number. For example, a mail address 1002 and a telephone number 1004 of a person of an officer level who is assumed to frequently exchange documents containing confidential information are registered beforehand as destinations that do not need the inspection process. A mail address 1003 that includes a character string "@mail" is registered as a destination that always needs the inspection. In this case, when a mail address of a transmission destination is not registered, it is controlled to be inspected.

In the step S901, the inspection setting management module 318 determines whether the job input at this time needs the inspection process by referring to the information shown in FIG. 10A. For example, the inspection setting management module 318 determines the necessity of the inspection process on the basis of the information about the transmission destination of the scan data designated by the input job.

Specifically, the inspection setting management module 318 determines whether an execution instruction (inspect) of the inspection process or a non-execution instruction (not inspect) of the inspection process is associated by checking the information about the transmission destination against a table 1000.

For example, when the transmission destination is the corporate storage server in the example shown in FIG. 10A, it is determined that the inspection is unnecessary because there is no possibility of information leakage to the outside. When the transmission destination is the cloud service or the e-mail address, it is determined that the inspection is necessary because there is possibility of information leakage to the outside. When at least one transmission destination among a plurality of selected transmission destinations needs the inspection, it is determined that the inspection is necessary.

As a result of the determination in the step S901, when the inspection setting management module 318 determines that the job input at this time does not need the inspection process, the process proceeds to the step S416. When the inspection setting management module 318 determines that the job input at this time needs the inspection process, the process proceeds to the step S412. Accordingly, only when the inspection is necessary, the determination process to the obtained scan data is executed.

According to the embodiment, the effect similar to that of the first embodiment can be produced about the improvement of the information leakage prevention effect about scan data. Moreover, since the inspection process is executed only about the job that needs the inspection process, the processing load of the image forming apparatus 100 can be reduced.

The necessity of the inspection process may be determined by a configuration of a communication path, authority of a transmission source user, or authority of a transmission destination user instead of the transmission destination.

Next, a third embodiment will be described. In the first and second embodiments, the image forming apparatus 100 consistently executes the determination process including the inspection. However, since resources of the CPU 111 and the HDD 115 are limited, a process may be delayed when a high load process is executed. Accordingly, in the third embodiment of the present invention, the image forming apparatus 100 executes the inspection process in coordination with the server device or the cloud service.

Figure 11:
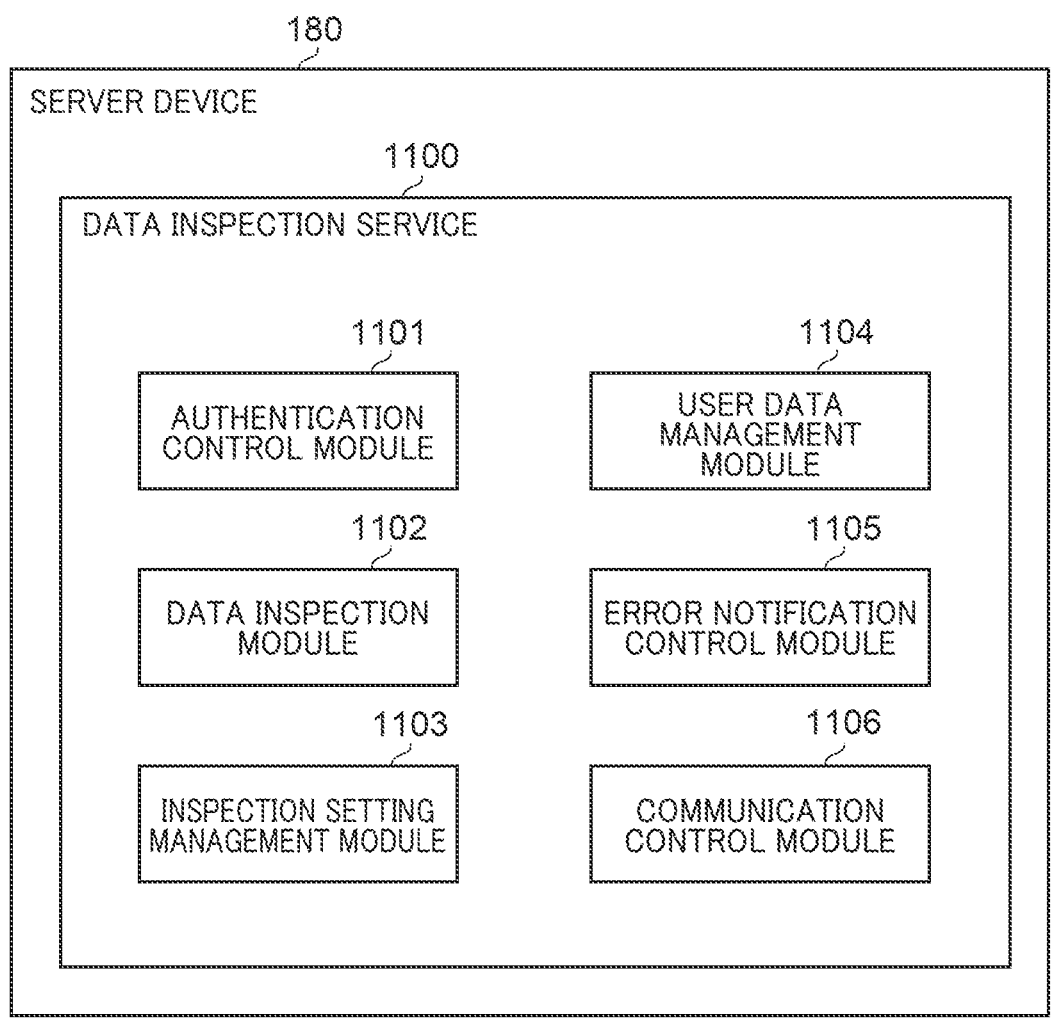
FIG. 11 is a block diagram schematically showing a software configuration of a server device according to a third embodiment of the present invention.

FIG. 11 is a block diagram schematically showing a software configuration of the server device 180 according to the third embodiment. It should be noted that a cloud server that has the configuration similar to that of the server device 180 may be employed instead of the server device 180. The server device 180 has data browsing service 1100. Function modules included in the data browsing service 1100 shown in FIG. 11 are mainly achieved by collaboration of a CPU, ROM, and RAM (not show) of the server device 180.

In the data browsing service 1100, an authentication control module 1101 manages authentication information about each user and provides functions depending on user's authority. A data inspection module 1102 performs the data inspection process on the basis of a character string described in scan data transmitted from the image forming apparatus 100. An inspection setting management module 1103 holds an inspection dictionary including inspection keywords (inspection-target character strings) that are needed for the data inspection process. A user data management module 1104 manages images, documents, etc. of users. An error notification control module 1105 has a function that notifies a user of an error when an inspection keyword exists in scan data. A communication control module 1106 has a role that communicates with the image forming apparatus 100.

Figure 12A:
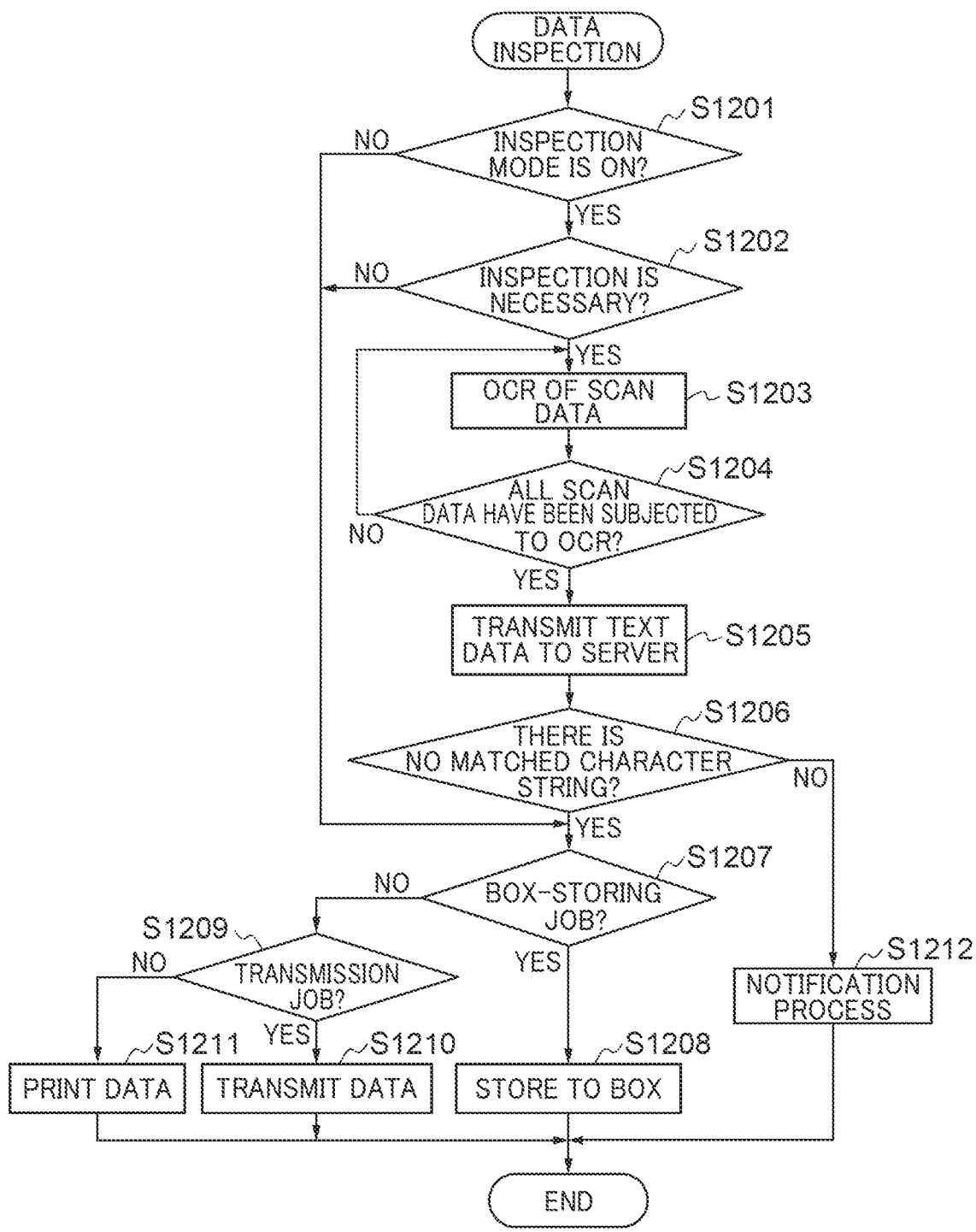
FIG. 12A and FIG. 12B are flowcharts respectively showing a data inspection process and a server-side inspection process in the third embodiment.

FIG. 12A is a flowchart showing a data inspection process in the third embodiment. This process is executed by the image forming apparatus 100, and an execution start condition is identical to that of the process shown in FIG. 4B. The second embodiment differs from the first embodiment in that the data inspection process shown in FIG. 12A is employed instead of that shown in FIG. 4B.

In steps S1201 and S1202, processes similar to that in the steps S411 and S901 in FIG. 9 are executed. As a result of the determination in the step S1202, when the inspection setting management module 318 determines that the job input at this time does not need the inspection process, the process proceeds to a step S1207. When it is determined that the job input at this time needs the inspection process, the process proceeds to a step S1203.

In steps S1203 through S1206, the CPU 111 executes a determination process to the scan data obtained in the step S401 in FIG. 4A. In the step S1203, the image processing module 315 executes the process identical to the process in the step S411.

In a step S1204, it is determined whether all the scan data have been subjected to the OCR. When not all the scan data have been subjected to the OCR, the process returns to the step S1203. When all the scan data have been subjected to the OCR, the process proceeds to a step S1205.

In the step S1205, the data inspection module 319 transmits text data (a character string) extracted in the step S1203 to the server device 180 that is an external apparatus by using the communication control module 317. That is, the data inspection module 319 requests the inspection of whether the inspection keyword is included in the extracted character string by transmitting the character string extracted from the scan data to the server device 180. The inspection dictionary including the inspection keyword is transmitted to the server device 180 at any time from the image forming apparatus 100. For example, whenever the dictionary registration process (FIG. 7) is executed, the inspection dictionary managed by the server device 180 is updated.

Figure 12B:
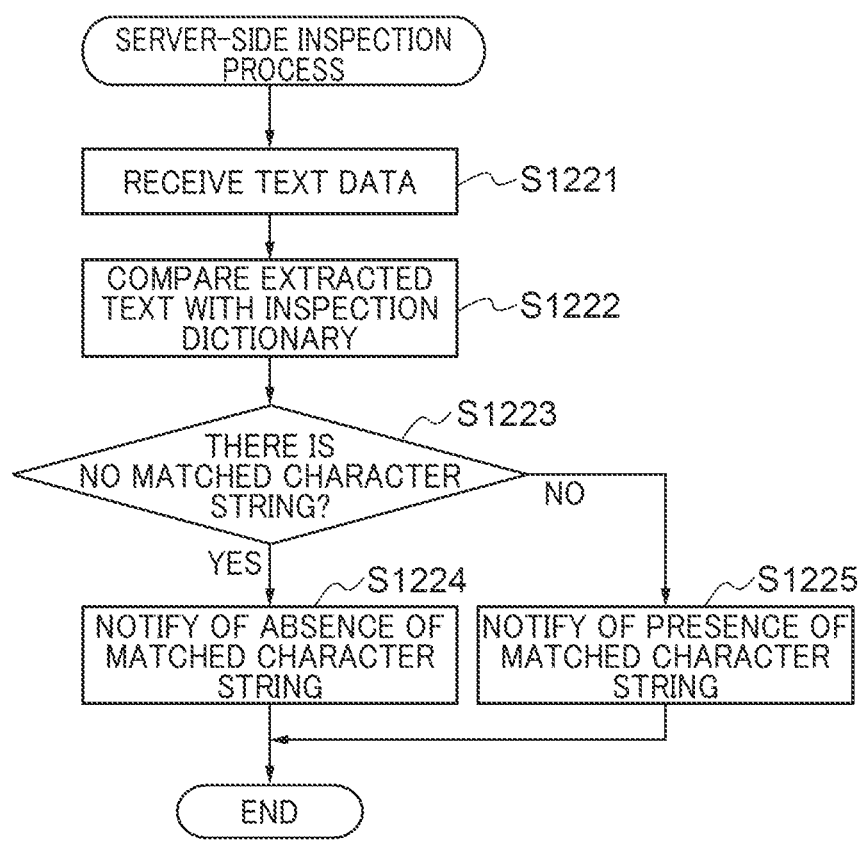

In response to the above-mentioned request, the server device 180 performs the inspection and replies an inspection result (FIG. 12B mentioned later). In the step S1206, the data inspection module 319 receives the inspection result from the server device 180 by using the communication control module 317. Furthermore, the data inspection module 319 determines whether there is no character string that matches the inspection keyword among the extracted character strings (i.e., whether the inspection keyword is not included in the extracted character strings) on the basis of the inspection result. As a result of the determination in the step S1206, when there is no character string that matches the inspection keyword among the extracted character strings, the data inspection module 319 proceeds with the process to the step S1207. In steps S1207 through S1211, the processes similar to that in the steps S416 and S420 in FIG. 4B are executed.

In the meantime, as a result of the determination in the step S1206, when there is a character string that matches the inspection keyword among the extracted character strings, the data inspection module 319 proceeds with the process to a step S1212 because the inspected data at this time has high necessity of the information leakage prevention. In the step S1212, the data inspection module 319 executes the process identical to the process in the step S413 in FIG. 4B. Accordingly, the inspected data is not printed, transmitted, and stored.

FIG. 12B is a flowchart showing a server-side inspection process executed by the server device 180. This process is achieved when the CPU of the server device 180 develops the program stored in the ROM of the server device 180 to the RAM of the server device 180 and runs it. This process is started when the request of the inspection transmitted in the step S1205 in FIG. 12A is received from the image forming apparatus 100.

In a step S1221, the communication control module 1106 receives the text data as an inspection target transmitted from the image forming apparatus 100. In a step S1222, the data inspection module 1102 executes the data inspection to the received text data. That is, the data inspection module 1102 compares the character string of the text data with the inspection dictionary so as to check whether the extracted character string includes the inspection keyword.

In a step S1223, the data inspection module 1102 determines whether there is no character string that matches the inspection keyword among the extracted character strings (the inspection keyword is not included in the extracted character strings) as the result of the data inspection in the step S1222. As a result of the determination, when there is no character string that matches the inspection keyword among the extracted character strings, the data inspection module 1102 proceeds with the process to a step S1224.

In the step S1224, the data inspection module 1102 notifies the image forming apparatus 100 of the inspection result that the output is available. That is, the data inspection module 1102 transmits the inspection result showing that there is no character string that matches the inspection keyword among the extracted character strings (absence of the matched character string) to the image forming apparatus 100 by using the communication control module 1106.

As a result of the determination in the step S1223, when there is the character string that matches the inspection keyword among the extracted character strings, the data inspection module 1102 proceeds with the process to a step S1225. In the step S1225, the data inspection module 1102 notifies the image forming apparatus 100 of the inspection result that the output is unavailable. That is, the data inspection module 1102 transmits the inspection result showing that there is the character string that matches the inspection keyword among the extracted character strings (presence of the matched character string) to the image forming apparatus 100 by using the communication control module 1106. The process shown in FIG. 12B is finished after the step S1224 or the step S1225.

According to the embodiment, the effect similar to that of the first embodiment can be produced about the improvement of the information leakage prevention effect about scan data.

Moreover, the image forming apparatus 100 requests the inspection by transmitting the character string extracted from the scan data to the server device 180 (S1205) in the determination process when trying to store or output the obtained scan data. Furthermore, the image forming apparatus 100 determines whether the inspection keyword (inspection-target character string) is included in the extracted character string (S1206) on the basis of the inspection result received from the server device 180. Accordingly, since the determination process is executed in coordination with the server device 180, the processing resources spent in the image forming apparatus 100 are reduced, which reduces delay of the process.

Next, a fourth embodiment will be described. In each of the above-mentioned embodiments, when there is the character string that matches the inspection keyword among the extracted character strings, the notification process that notifies a user of an error is performed and the scan data is not printed, transmitted, and stored. Particularly, when the input job is a transmission job (a scan-and-transmission job, facsimile transmission job), the transmission itself becomes impossible. Accordingly, in the fourth embodiment, even if the scan data includes the character string that matches the inspection keyword, the transmission is available under a certain condition.

Figure 13:
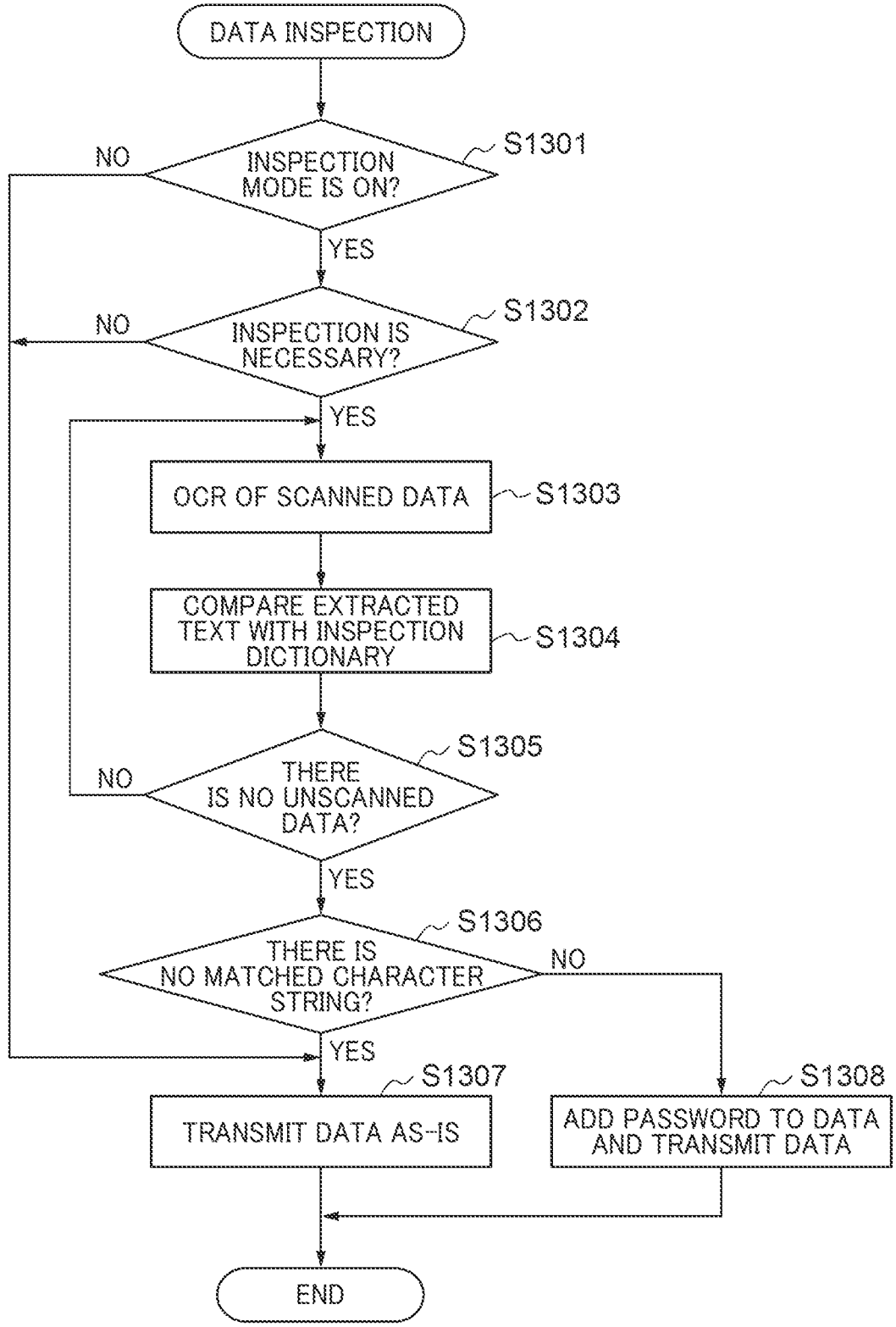
FIG. 13 is a flowchart showing a data inspection process in a fourth embodiment of the present invention.

FIG. 13 is a flowchart showing a data inspection process in the fourth embodiment. This process is executed by the image forming apparatus 100, and an execution start condition is identical to that of the process shown in FIG. 4B. The fourth embodiment differs from the first embodiment in that the data inspection process shown in FIG. 13 is additionally employed as the data inspection process. This process is executed depending on the start of the scan process (FIG. 4A) based on a transmission job.

The process shown in FIG. 4B and the process shown in FIG. 13 are used together. That is, when the input job is a copy job or a BOX-storing job, the process shown in FIG. 4B is executed, and when it is a scan-and-transmission job or a facsimile transmission job, the process shown in FIG. 13 is executed. It should be noted that the step S419 in FIG. 4B is omitted.

In a steps S1301, a process similar to that in the step S411 in FIG. 4B is executed. As a result of the determination in the step S1301, when the inspection mode is set to ON, the inspection setting management module 318 proceeds with the process to a step S1302. When the inspection mode is set to OFF, the process proceeds to a step S1307.

In the step S1302, a process similar to that in the steps S901 in FIG. 9 is executed. As a result of the determination in the step S1302, when the inspection setting management module 318 determines that the job input at this time does not need the inspection process, the process proceeds to the step S1307. When it is determined that the job input at this time needs the inspection process, the process proceeds to a step S1303. In the step S1307, the process similar to that in the step S419 is executed. That is, the scan data is transmitted as-is.

In steps S1303 through S1306, the CPU 111 executes a determination process to the scan data obtained in the step S401 in FIG. 4A. In steps S1303, S1304, and S1305, the processes similar to that in the steps S412, S413 and S415 in FIG. 4B are executed. As a result of the determination in the step S1305, when there is an uninspected data, the data inspection module 319 returns the process to the step S1303. When there is no uninspected data, the process proceeds to the step S1306 because the data inspection of all the data is finished.

In the step S1306, the data inspection module 319 determines whether there is no character string that matches the inspection keyword among the extracted character strings (the inspection keyword is not included in the extracted character strings) as the result of the data inspection in the step S1304. As a result of the determination in the step S1306, when there is no character string that matches the inspection keyword among the extracted character strings, the data inspection module 319 proceeds with the process to the step S1307. In the meantime, when there is a character string that matches the inspection keyword among the extracted character strings, the data inspection module 319 proceeds with the process to a step S1308.

In the step S1308, the communication control module 317 adds a password to the scan data and transmits the scan data to which the password is added to the transmission destination designated by the user by the designated transmission method.

For example, the communication control module 317 converts the scan data into a PDF with password so as to prevent unfair reference of the scan data. The user may set the password to the inspection setting management module 318 beforehand. Alternatively, the user may designate the password through an input screen displayed on the operation unit 130. In order to prevent an unfair operation, a signature may be added and the data may be encrypted in addition to the addition of password. A file format into which the scan data is converted may be set through the setting screen beforehand. An unfair operation may be prevented by encrypting a communication path by SSL in addition to the file conversion. For example, a communication protocol of data transmission may be changed from SMTP to SMPTS. The process shown in FIG. 13 is finished after the step S1307 or the step S1308.

According to the embodiment, the effect similar to that of the first embodiment can be produced about the improvement of the information leakage prevention effect about scan data.

Moreover, when the inspection keyword is included in the extracted character string in execution of the scan-and-transmission job, the scan data is transmitted after a password, encryption, etc. are applied to the scan data (S1308). Thereby, even if the scan data is determined that there is a possibility of information leakage when being transmitted as-is, the transmission is securable while avoiding information leakage by applying a password, encryption, etc. Accordingly, a user's burden is reduced.

Although the present invention has been described in detail on the basis of the suitable embodiments, the present invention is not limited to these specific embodiments, and various configurations that do not deviate from the scope of the present invention are also included in the present invention. Parts of the above-mentioned embodiments may be combined suitably.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-093723, filed Jun. 3, 2021 and No. 2022-056180, filed Mar. 30, 2022, which are hereby incorporated by reference herein in their entireties.

What is claimed is:

1. An information processing apparatus comprising:
at least one memory device that stores instructions; and
at least one processor that executes the instructions to:
    extract a character string from scan data obtained by scanning a document;
    set one of a plurality of settings, including a first setting and a second setting, wherein:
        the first setting causes execution of an inspection process, which determines whether a registered predetermined character string is included in the extracted character string, in a state where a predetermined transmission destination is designated as information about a transmission destination of the scan data, and
        the second setting does not cause execution of the inspection process, in a state where the predetermined transmission destination is designated as the information about the transmission destination of the scan data;
    execute the inspection process on the scan data, in a state where the first setting is set and the predetermined transmission destination is a first transmission destination; and
    not execute the inspection process on the scan data, in a state where the first setting is set and the predetermined transmission destination is a second transmission destination different from the first transmission destination.

2. The information processing apparatus according to claim 1, wherein the at least one processor executes the instructions to not transmit the scan data, in a state where the predetermined character string has been determined to be included in the extracted character string.

3. The information processing apparatus according to claim 1, wherein the at least one processor executes the instructions to transmit the scan data, in a state where the predetermined character string has been determined to be not included in the extracted character string.

4. The information processing apparatus according to claim 1, wherein the at least one processor executes the instructions to:
    register the information about the transmission destination associatively with one of an execution instruction or a non-execution instruction of the inspection process; and
    execute the inspection process, in a state where the information about the transmission destination is associated with the execution instruction of the inspection process.

5. The information processing apparatus according to claim 4, wherein the at least one processor executes the instructions to not execute the inspection process, in a state where the information about the transmission destination is associated with the non-execution instruction of the inspection process.

6. The information processing apparatus according to claim 1, wherein the information about the transmission destination is one of a telephone number, a mail address, information that designates a file of a server device, or information that designates a file of a cloud service.

7. A control method for an information processing apparatus, the control method comprising:
    obtaining scan data by reading a document;
    extracting a character string from the scan data;
    setting one of a plurality of settings, including a first setting and a second setting, wherein:
        the first setting causes execution of an inspection process, which determines whether a registered predetermined character string is included in the extracted character string, in a state where a predetermined transmission destination is designated as information about a transmission destination of the scan data; and
        the second setting does not cause execution of the inspection process, in a state where the predetermined transmission destination is designated as the information about the transmission destination of the scan data;
    executing the inspection process on the scan data, in a state where the first setting is set and the predetermined transmission destination is a first transmission destination; and
    not executing the inspection process on the scan data, in a state where the first setting is set and the predetermined transmission destination is a second transmission destination different from the first transmission destination.

8. The information processing apparatus according to claim 1, wherein the first transmission destination includes a cloud service.

9. The information processing apparatus according to claim 1, wherein the at least one processor:
    executes the instructions to register information about the second transmission destination as the transmission destination in accordance with an instruction from a user; and not executes the inspection process on the scan data, in a state where the first setting is set and the predetermined transmission destination is the registered second transmission destination.

10. The information processing apparatus according to claim 1, wherein the inspection process includes execution of an optical character recognition (OCR).

11. The information processing apparatus according to claim 10, wherein the at least one processor executes the instructions to set whether or not to execute the OCR as the scan data is being obtained.

12. The information processing apparatus according to claim 10, wherein the at least one processor executes the instructions to not execute the inspection process, in a state where the second setting is set and the OCR has been already executed on the obtained scan data.

* * * * *